(12) United States Patent
Hermey et al.

(10) Patent No.: US 10,723,594 B2
(45) Date of Patent: Jul. 28, 2020

(54) COUPLING UNIT

(71) Applicant: igus GmbH, Cologne (DE)

(72) Inventors: Andreas Hermey, Hennef (DE); Philip Howold, Frechen (DE)

(73) Assignee: IGUS GMBH, Cologne (DE)

( * ) Notice: Subject to any disclaimer, the term of this patent is extended or adjusted under 35 U.S.C. 154(b) by 249 days.

(21) Appl. No.: 15/744,481

(22) PCT Filed: Jul. 14, 2016

(86) PCT No.: PCT/EP2016/066837
§ 371 (c)(1),
(2) Date: Jan. 12, 2018

(87) PCT Pub. No.: WO2017/009441
PCT Pub. Date: Jan. 19, 2017

(65) Prior Publication Data
US 2018/0208443 A1   Jul. 26, 2018

(30) Foreign Application Priority Data

Jul. 14, 2015 (DE) .................... 20 2015 004 918 U

(51) Int. Cl.
*B66C 13/12* (2006.01)
*G02B 6/36* (2006.01)
*H01R 13/60* (2006.01)

(52) U.S. Cl.
CPC ............. *B66C 13/12* (2013.01); *G02B 6/36* (2013.01); *H01R 13/60* (2013.01)

(58) Field of Classification Search
CPC .......... B66C 13/12; G02B 6/36; H01R 13/60; H01R 13/6315; H01R 43/26;
(Continued)

(56) References Cited

U.S. PATENT DOCUMENTS

| | | | | |
|---|---|---|---|---|
| 5,306,999 A | * | 4/1994 | Hoffman | B60L 53/305 320/109 |
| 5,498,948 A | * | 3/1996 | Bruni | H02J 7/025 320/108 |

(Continued)

FOREIGN PATENT DOCUMENTS

| | | |
|---|---|---|
| CN | 201440562 | 4/2010 |
| CN | 201466547 | 5/2010 |

(Continued)

OTHER PUBLICATIONS

Office Action from related Chinese Appln. No. 201680041350.X, dated Nov. 15, 2018. English translation of the Search Report attached.

(Continued)

*Primary Examiner* — Mark T Le
(74) *Attorney, Agent, or Firm* — Grossman, Tucker, Perreault & Pfleger, PLLC

(57) ABSTRACT

Coupling unit for coupling a freely movable device into an energy chain system which is connected to a coupling carriage that is movable parallel to the displacement path of the device, wherein the coupling unit has a first plug part which is able to be connected to the device in a flexible and tension-resistant manner and which is able to be connected to a second plug part arranged on the coupling carriage, wherein the coupling unit is able to be extended in the direction of the coupling carriage, wherein the coupling carriage has a guide unit by way of which a vertically displaceable strut arranged on the device is able to be raised with the first plug part, and wherein, when the coupling carriage stops in a predetermined position relative to the device the strut drops into a receptacle of the coupling carriage and surrounds the latter, wherein the two plug parts (Continued)

are positioned horizontally and vertically with respect to one another.

6 Claims, 11 Drawing Sheets

(58) Field of Classification Search
CPC .............. B65H 2701/34; B65H 75/425; B65H 75/4402; H02G 11/00; H02G 11/02; H02G 11/006; B60L 53/35
See application file for complete search history.

(56) References Cited

U.S. PATENT DOCUMENTS

| | | | | |
|---|---|---|---|---|
| 5,617,003 | A * | 4/1997 | Odachi | H01M 10/44 320/108 |
| 9,669,715 | B2 | 6/2017 | Maier et al. | |
| 10,179,721 | B2 * | 1/2019 | Teruzzi | B66C 13/12 |
| 2009/0127048 | A1 | 5/2009 | Ichimura | |
| 2012/0043291 | A1 | 2/2012 | Ichimura | |
| 2014/0217977 | A1 * | 8/2014 | Pastoor | B60L 11/1833 320/109 |
| 2016/0347586 | A1 | 12/2016 | Hermey et al. | |
| 2017/0022033 | A1 | 1/2017 | Raabe et al. | |

FOREIGN PATENT DOCUMENTS

| | | | |
|---|---|---|---|
| CN | 201770423 | | 3/2011 |
| CN | 102126677 | | 7/2011 |
| CN | 202124432 | | 1/2012 |
| DE | 10 2008 024 572 | * | 11/2009 |
| DE | 102008024572 | | 11/2009 |
| DE | 10 2011 001 712 | * | 10/2012 |
| DE | 102011002334 | | 10/2012 |
| DE | 202014100481 | | 6/2014 |
| DE | 102014105228 | | 10/2015 |
| EP | 2 053 008 | * | 4/2009 |
| JP | 2009-242101 | * | 10/2009 |
| JP | 2014-72959 | * | 4/2014 |
| WO | WO 2012/000210 | * | 1/2012 |
| WO | 2012/130630 | | 10/2012 |

OTHER PUBLICATIONS

English translation of International Preliminary Examination Report from corresponding PCT Application No. PCT/EP2016/066837 dated Jan. 16, 2018.

English translation of International Search Report rom corresponding PCT Application No. PCT/EP2016/066837 dated Dec. 10, 2016.

* cited by examiner

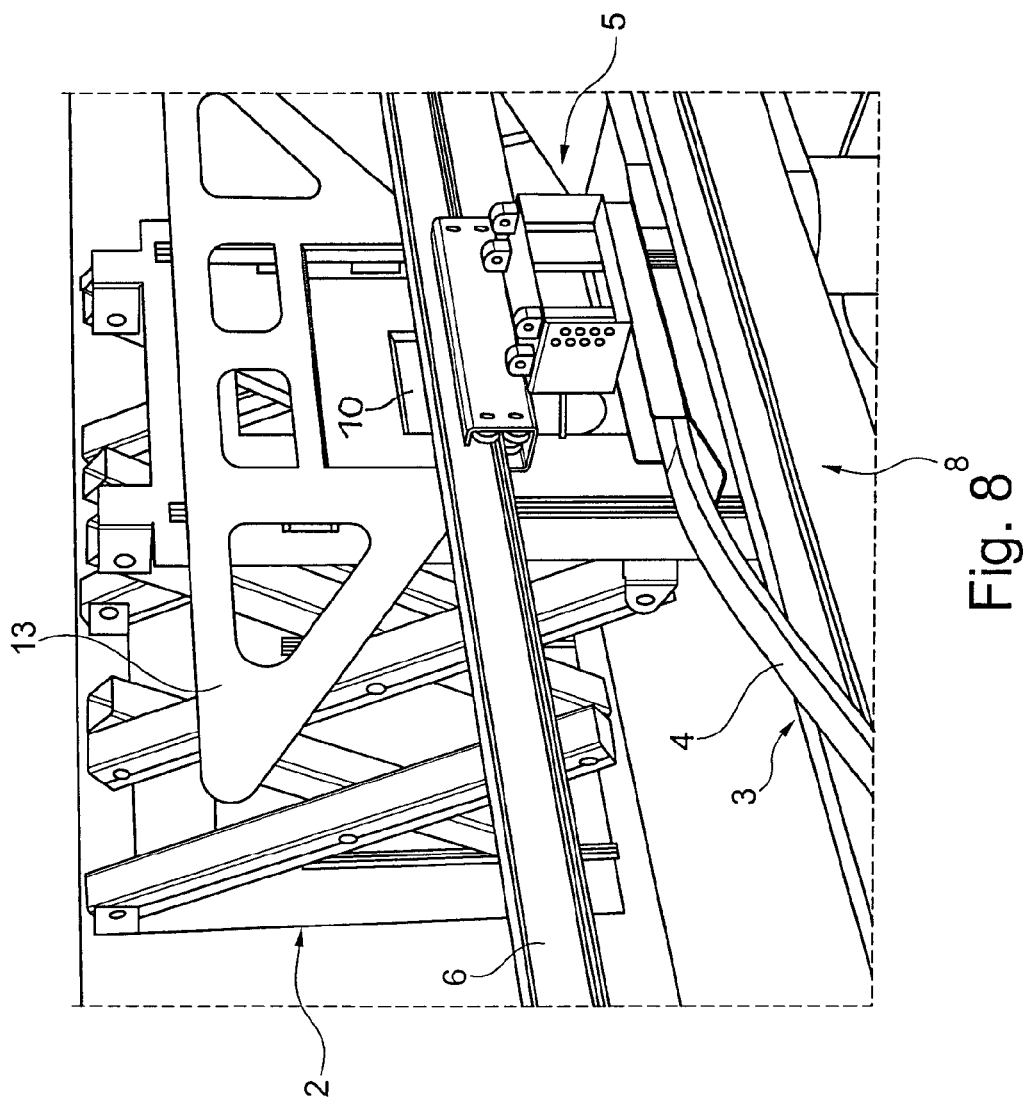

COUPLING UNIT

FIELD

The invention concerns a coupling unit for coupling a freely displaceable device into an energy chain system having an energy chain which is fixedly connected to a coupling carriage (coupling trolley) which is displaceable parallel to the path of displacement of the device, wherein the coupling unit has a first plug portion which can be connected to the device in flexible and tensile-resistant relationship and which can be connected to a second plug portion arranged on the coupling trolley, the coupling unit can be extended with the first plug portion in the direction of the coupling trolley so that the two plug portions can be positioned horizontally and vertically relative to each other and can be connected together, and the coupling unit after connection of the two plug portions can be displaced back, wherein the device and the coupling trolley remain connected together in tensile-resistant and flexible relationship.

The invention further concerns a system comprising a coupling unit of the above-described kind and a coupling trolley.

The invention also concerns a system comprising a freely displaceable device having a coupling unit of the above-described kind and a coupling trolley.

Finally the invention also concerns a method of coupling a freely displaceable device by way of a coupling unit into an energy chain system having an energy chain which is fixedly connected to a coupling carriage (coupling trolley) which is displaceable parallel to the path of displacement of the device, wherein the coupling unit has a first plug portion which is connected to the device in flexible and tensile-resistant relationship and which is connected to a second plug portion arranged at the coupling trolley, the coupling unit is extended with the first plug portion in the direction of the coupling trolley so that the two plug portions are positioned horizontally and vertically relative to each other and are connected together.

BACKGROUND

A coupling unit of the kind set forth in the opening part of this specification, a system comprising a coupling unit and a coupling trolley and a system comprising a freely displaceable device with a coupling unit and a coupling trolley as well as a method of the above-indicated kind are known from DE 20 2014 100 481 U1.

The device is for example an RTG (Rubber Tired Gantry), a device similar thereto, a crane installation or other machine. The device to be coupled is more or less free-running and is connected for certain purposes to an energy chain system. The aim of that temporary connection is the transmission of energy, data or media. For that purpose electric lines, optical waveguides or hoses are connected together by suitable plugs.

This connection is to be found on a "coupling trolley" which travels in the longitudinal direction parallel to the energy chain and to the path of displacement of the device. That "coupling trolley" carries a part of the plug and is fixedly connected to the energy chain. The coupling trolley is mounted longitudinally displaceably on a suitable profile member and is driven, and is therefore "self-displacing".

SUMMARY

The aim of the present invention is:
to implement the automatic coupling operation,
to ensure positioning of the plugs prior to coupling engagement,
to achieve a flexible tensile-resistant connection between the device and the coupling trolley in order to be able to compensate for deviations in the paths of displacement relative to each other so that the device can follow along behind the coupling trolley,
to implement coupling and uncoupling at any position along the path of displacement,
so that the coupling trolley can pass in self-displacing relationship to any position along the path of displacement.

In order to achieve those aims according to the invention there is proposed a coupling unit of the kind set forth in the opening part of this specification, wherein the coupling unit has a vertically displaceable wedge-shaped blade at which the first plug portion is arranged and the blade is so designed that it can be raised with the first plug portion when the coupling trolley upon displacement parallel to the path of displacement of the device with the coupling unit extended meets the blade with a guide device and when the coupling trolley stops in a predetermined position relative to the device the blade falls into a receiving means of the coupling trolley and embraces same, wherein the two plug portions are positioned horizontally and vertically relative to each other.

In a system comprising a coupling unit and a coupling trolley of the kind described in the opening part of this specification the above-mentioned aims are achieved in that the coupling trolley has a guide device with which a vertically displaceable blade arranged on the device and having the first plug portion can be raised when the coupling trolley upon displacement parallel to the path of displacement of the device with the coupling unit extended meets the blade with the guide device and the blade is so designed that when the coupling trolley stops in a predetermined position relative to the device the blade falls into a receiving means of the coupling trolley and embraces same, wherein the two plug portions are positioned horizontally and vertically relative to each other.

In a system comprising a freely displaceable device with a coupling unit and a coupling trolley of the kind set forth in the opening part of this specification, the above-mentioned aims are also achieved by the foregoing features.

Furthermore in a method of the above-indicated kind the aims are achieved by the following method features, namely the coupling trolley upon displacement parallel to the path of displacement of the device with the coupling unit extended meets a vertically displaceable blade arranged on the device with a guide device and lifts same with the first plug portion, thereafter with the blade lifted the coupling trolley stops in a predetermined position relative to the device and the blade in that position falls into a receiving means of the coupling trolley and embraces same, wherein the two plug portions are positioned horizontally and vertically relative to each other and the two plug portions are thereafter connected together.

Thereafter the coupling unit with the plug portions still coupled can be retracted and after the device is set in movement again the coupling trolley is entrained by the device by flexible and tensile-resistant connection to the device.

The two plug portions can be separated from each other again, in which case the first plug portion can then be retracted into the starting position in the coupling unit.

BRIEF DESCRIPTION OF THE DRAWINGS

An embodiment of the present invention is described in greater detail hereinafter with reference to the drawing in which:

FIG. 8 shows a perspective front view of the coupling trolley and the coupling unit with blade, wherein the coupling trolley stops in the center of the blade;

DETAILED DESCRIPTION

Figure 1:
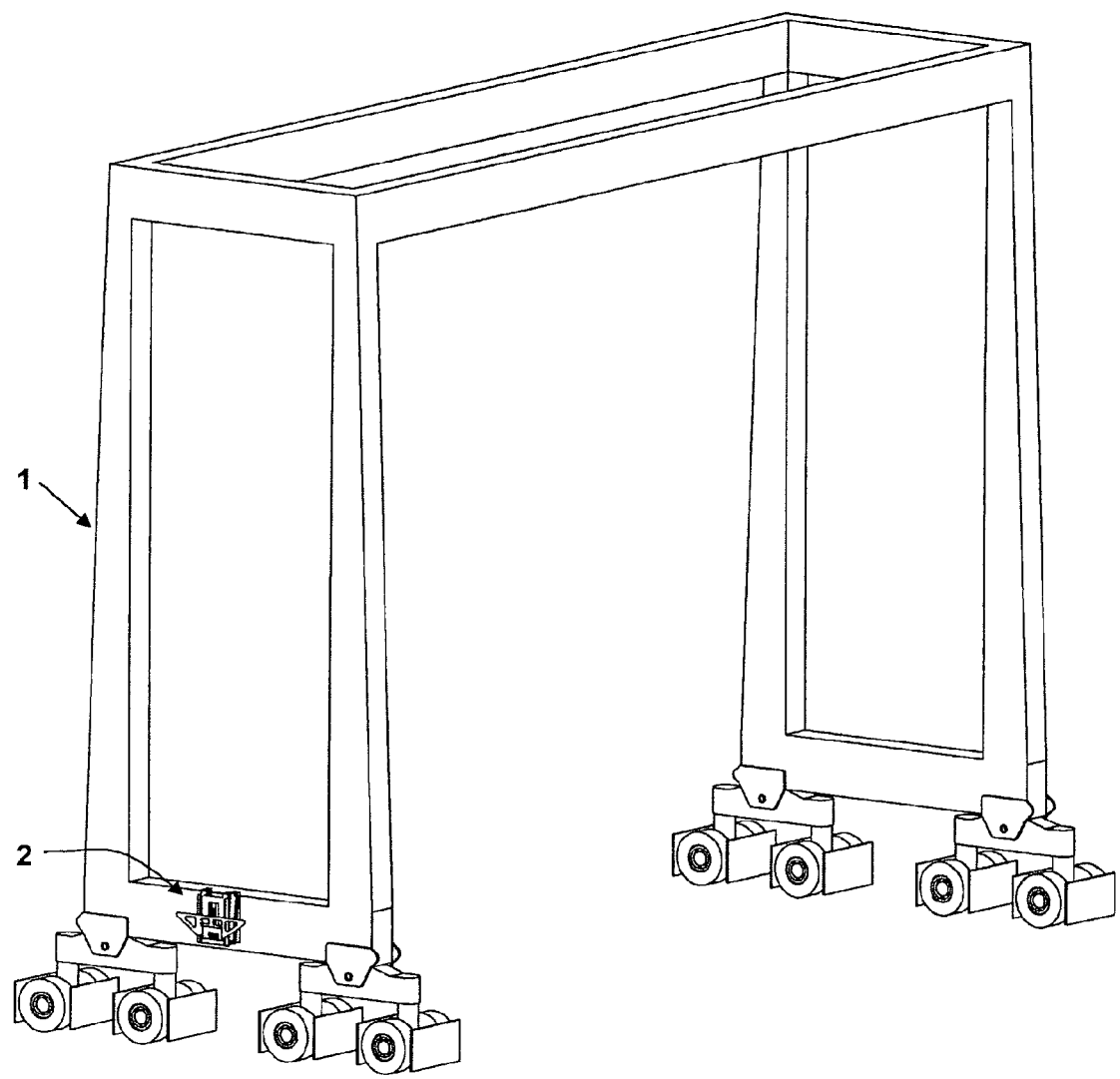
FIG. 1 shows a perspective view of an RTG (Rubber Tired Gantry) as a freely displaceable device.
Figure 2:
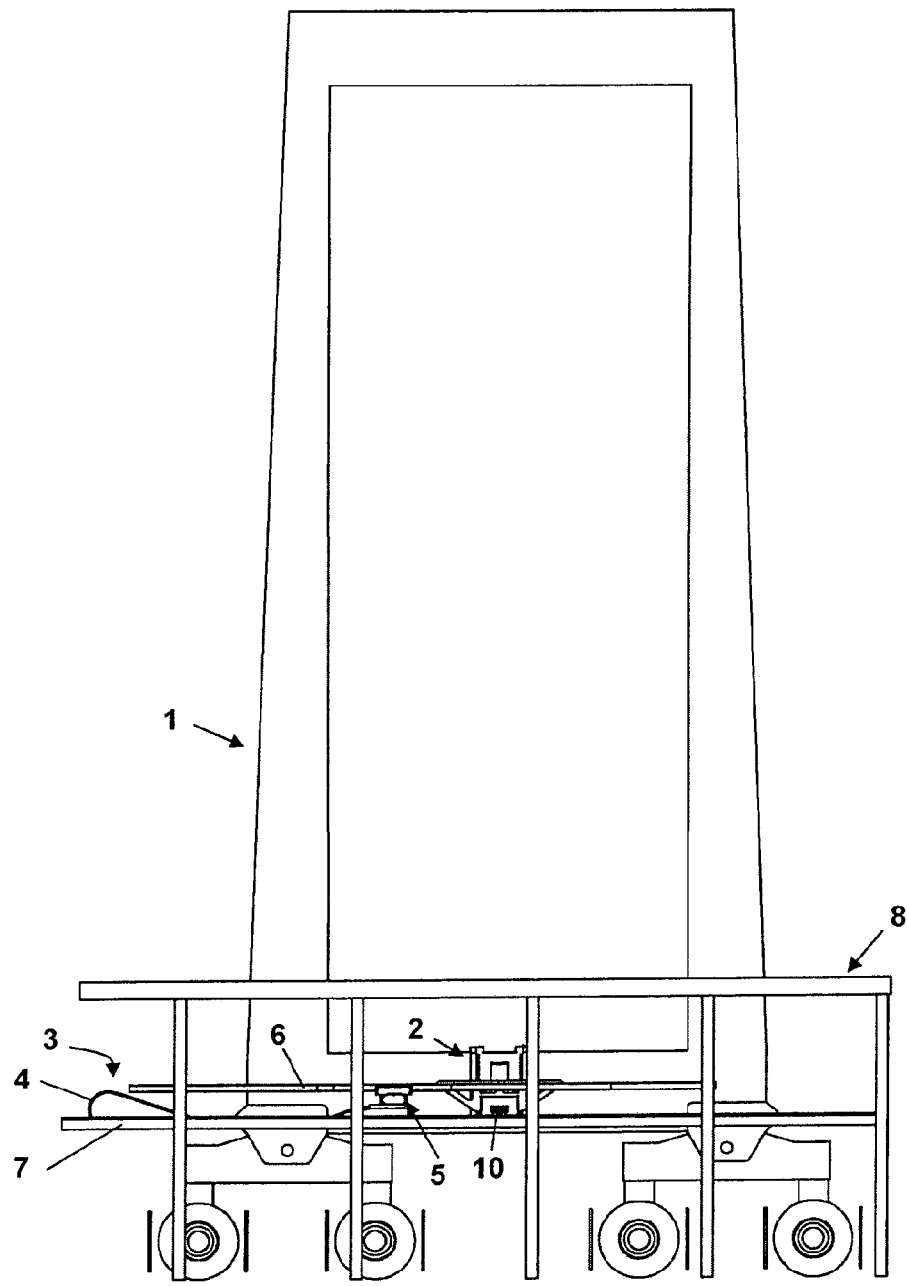
FIG. 2 shows the RTG of FIG. 1 with a coupling unit as a side view and a coupling trolley with mounted guide system on a frame structure.
Figure 3:
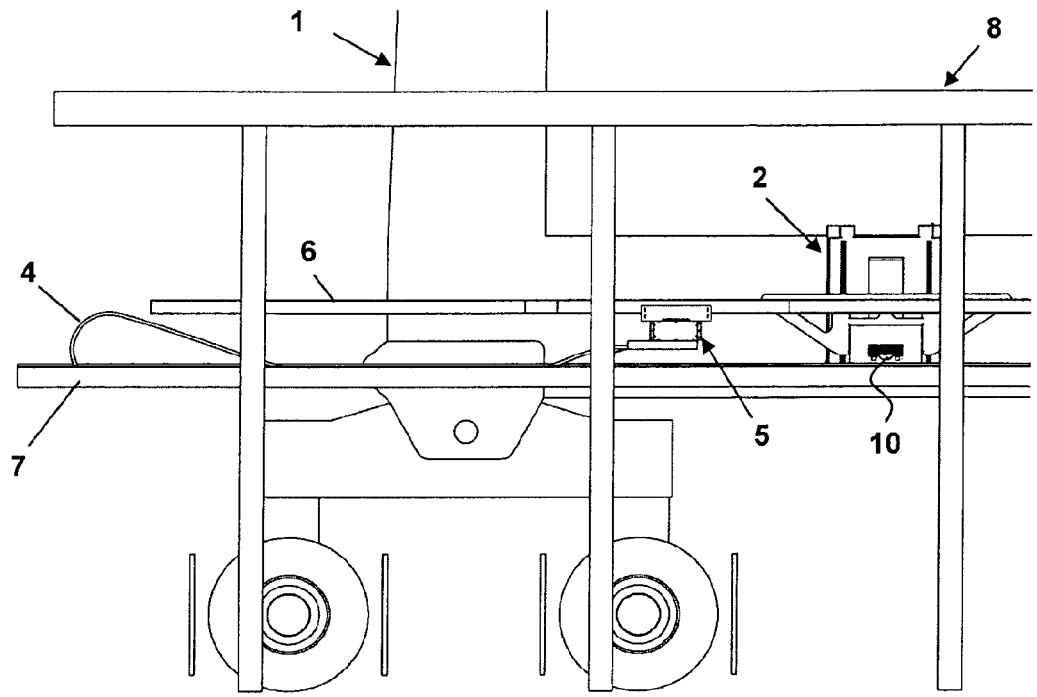
FIG. 3 shows a view on an enlarged scale of part of FIG. 2.
Figure 4:
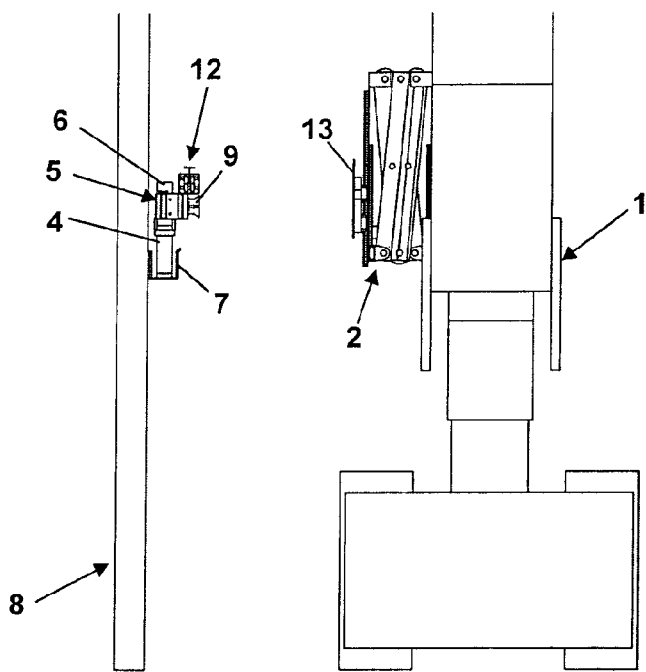
FIG. 4 shows a front view of the lower region of the device and the frame structure as well as the coupling unit.

A system comprising a freely displaceable device 1, here an RTG (Rubber Tired Gantry), with a coupling unit 4 for automatically coupling the device 1 to an energy chain system 3 having an energy chain 4 which is fixedly connected to a coupling carriage 5 (coupling trolley) can be seen in particular from FIGS. 2 through 4. The coupling trolley 5 is mounted on a suitable profile member 6 and is displaceable parallel to the path of displacement of the device 1. The coupling trolley 5 is connected to the moveable end of the energy guide chain 4 for the transmission of energy, data or media to the device 1 to be coupled, by electric lines, optical waveguides or hoses. The energy chain 4 extends in a guide channel 7 shown in particular in FIGS. 3 and 4 parallel to the profile member 6 and to the path of displacement of the device 1. The profile member 6 on which the coupling trolley 5 is displaceable and the guide channel 7 for the energy chain 4 are arranged on a frame structure 8.

The coupling trolley 5 carries a second plug portion 9 for making a connection to a first plug portion 10 which is arranged at the coupling unit 2 and connected to the device 1 by way of a flexible and tensile-resistant connection 11 which can be a tensile-resistant hose, a cable or a link chain.

Figure 5:
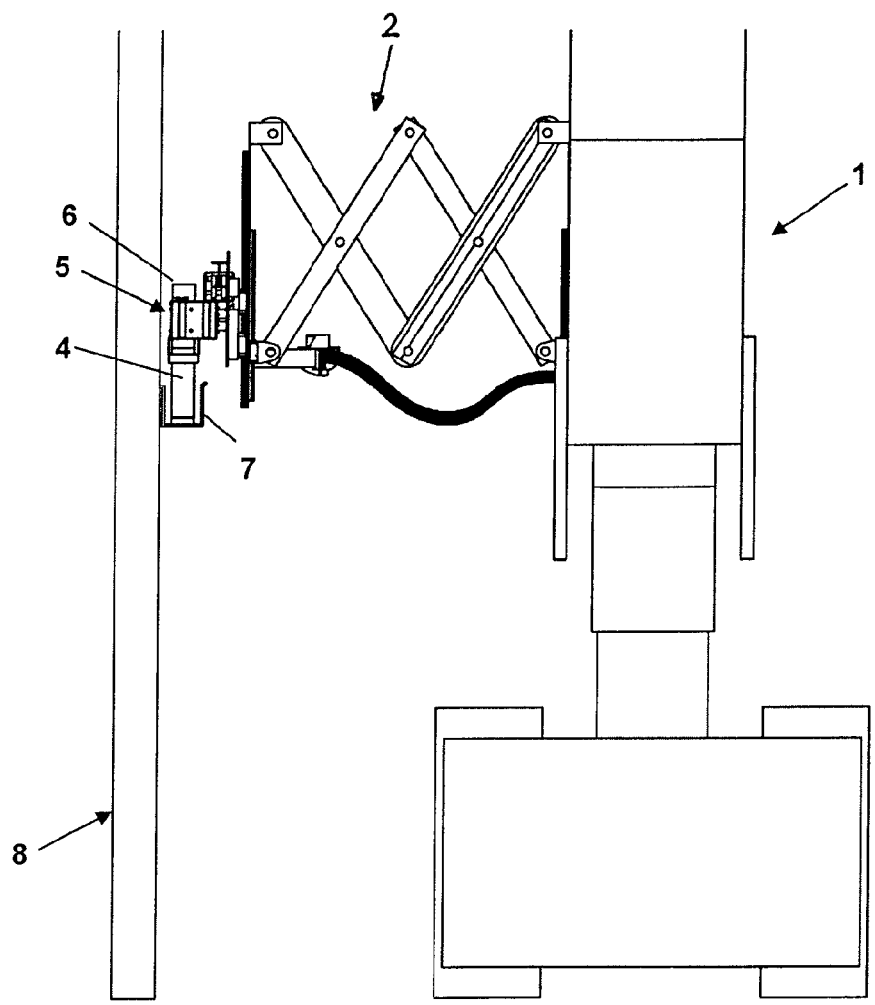
FIG. 5 shows a front view of the lower region of the device and the frame structure as well as the extended coupling unit.
Figure 12:
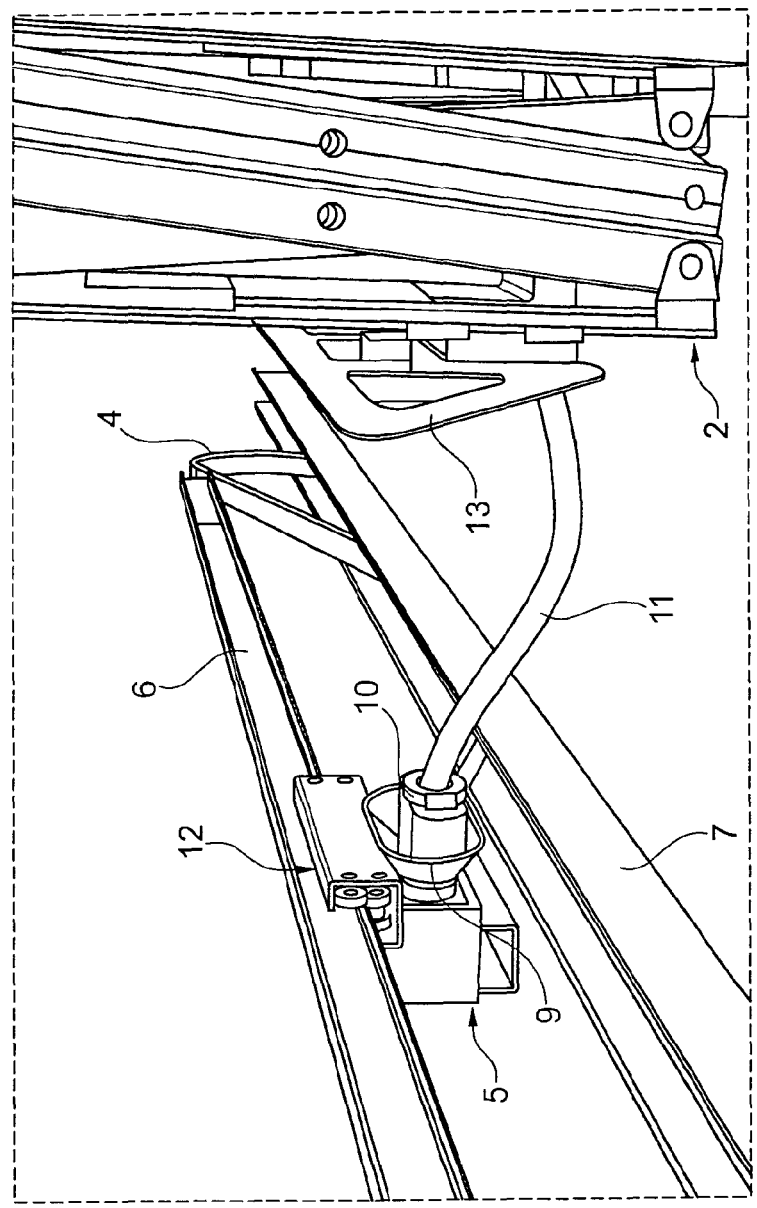
FIG. 12 shows a side view of the coupling unit which has been moved back and the coupling trolley with coupled plug portions and flexible tensile-resistant connection between the device and the coupling trolley.
Figure 13:
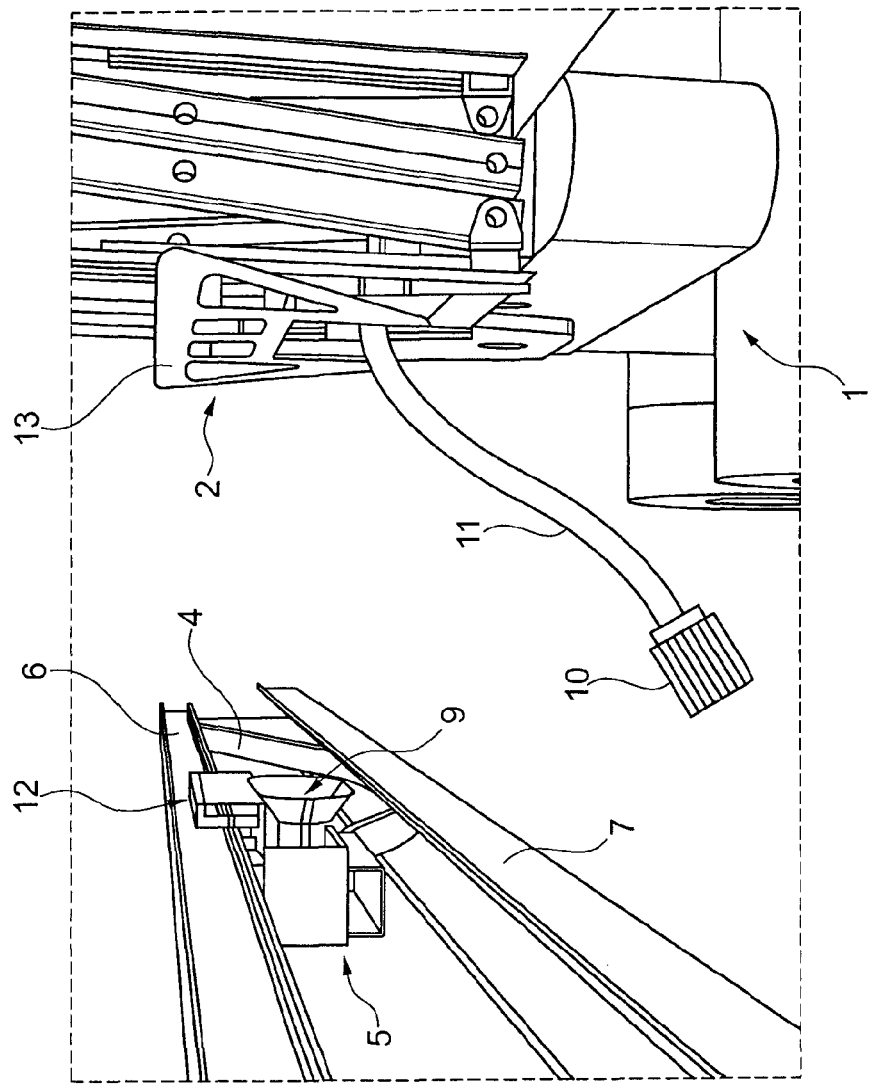
FIG. 13 shows a side view of FIG. 12 with the plug portions separated from each other.

As can be seen in particular from FIGS. 4 and 5 the coupling unit can be extended in a direction towards the coupling trolley 5 and moved back again therefrom, as can be seen from FIGS. 12 and 13. FIGS. 2 through 4 show the coupling unit 2 in a pre-positioned but not yet extended condition. In such a pre-positioned condition in which the coupling trolley 5 is still remote from the coupling unit 2 of the device 1 in the horizontal direction, as shown in FIGS. 2 and 3, the coupling unit can be extended in the direction of the coupling trolley 5, as shown in FIG. 5. In that way the first plug portion 10 of the device 1 is also moved in that direction. The coupling unit 2 is now in its waiting position shown in FIG. 5. In that position the coupling trolley 5 and the coupling unit 2 are still spaced in a horizontal direction, as shown in FIG. 3.

Figure 6:
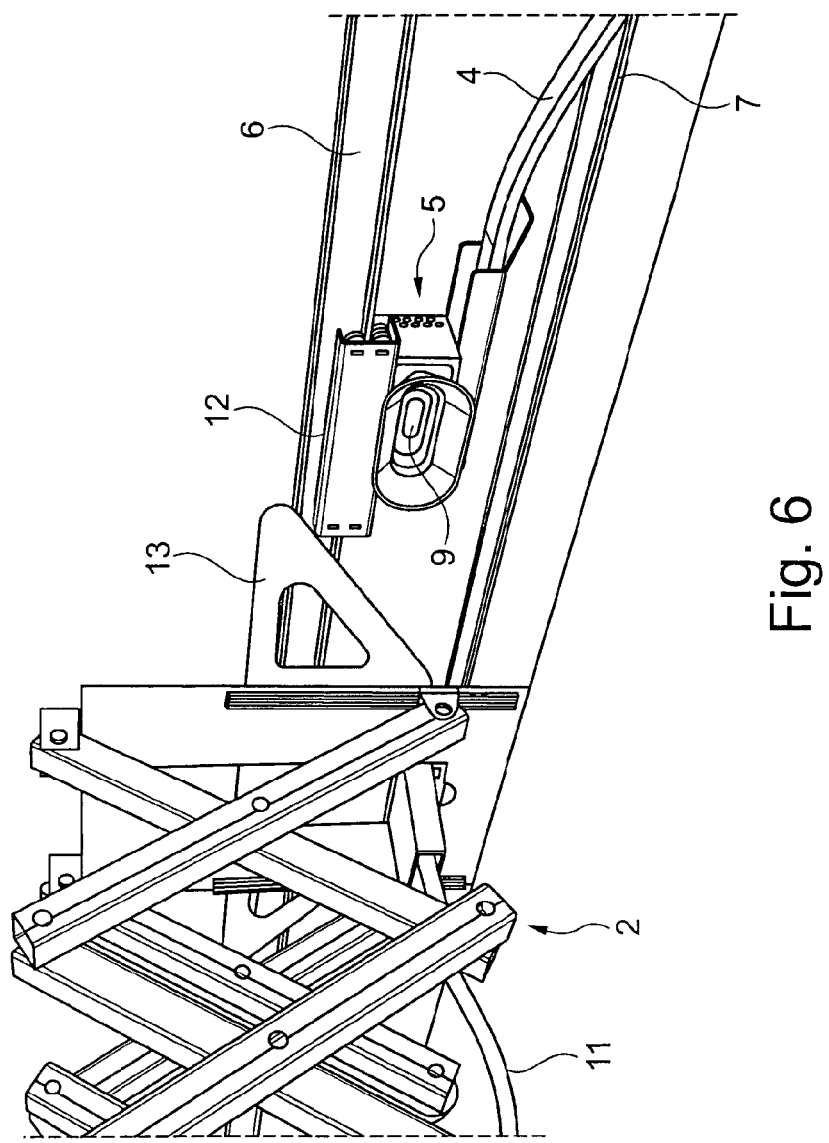
FIG. 6 shows a perspective rear view of the extended coupling unit with blade in a position in which the blade meets a guide device of the coupling trolley.
Figure 7:
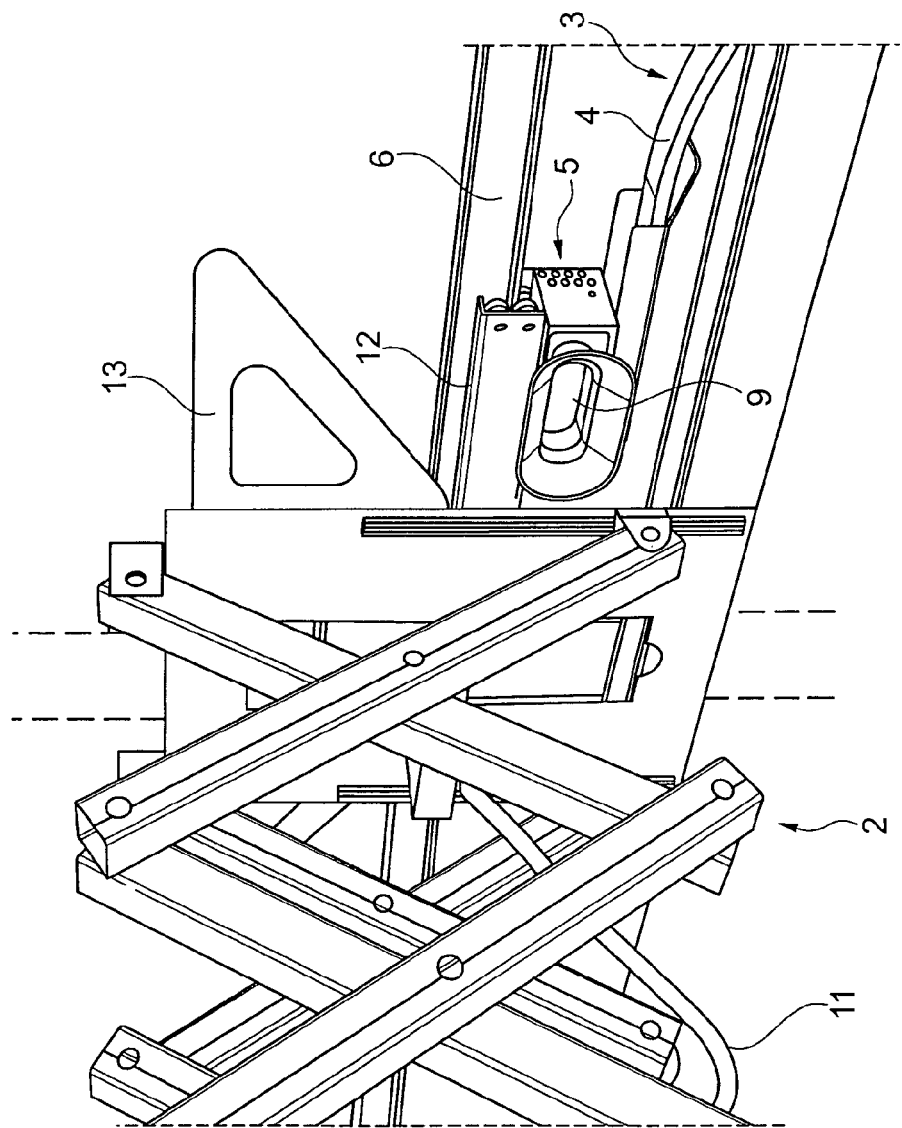
FIG. 7 shows a view as in FIG. 6 in a position in which the blade is pushed up by the guide device.

From the waiting position shown in FIG. 5, the coupling trolley 5 can then be set in movement as shown in FIG. 3 towards the right in a direction towards the coupling unit 2. In that movement the coupling trolley 5 with a suitable guide device 12 meets a wedge-shaped blade 13 which is vertically displaceable on the coupling unit 2, as shown in FIG. 6. Upon further displacement of the coupling trolley 5 towards the blade 13 the blade 13 is pushed up whereby the first plug portion 10 is also raised, as can be seen from FIG. 7.

The coupling trolley 5 moves further into a position in which it is in the center of the blade 13 and stops in that position, as shown in FIG. 8. In that position the two plug portions 9 and 10 are positioned in horizontally coincident relationship.

Figure 9:
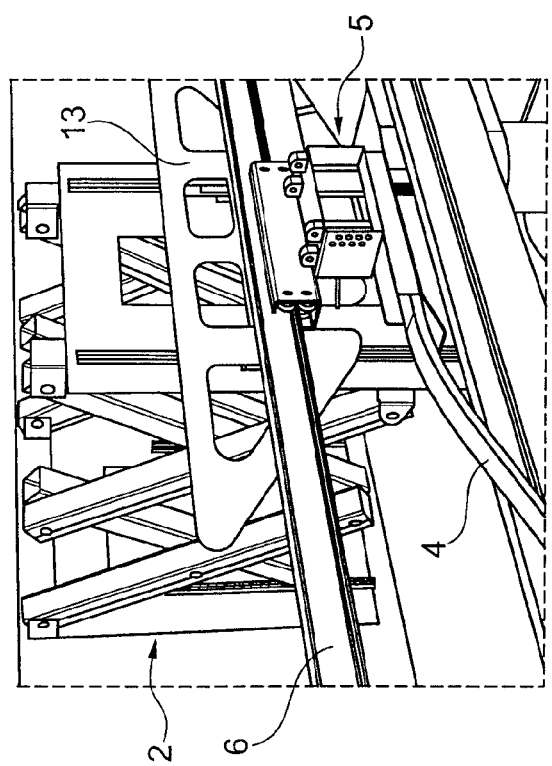
FIG. 9 shows a view as in FIG. 8, wherein the blade has fallen into a receiving means of the coupling trolley and embraces it.

In that position the blade 13 under the force of gravity acting thereon falls into a suitable receiving means of the coupling trolley 5, in which case it embraces same, as shown in FIG. 9.

Figure 10:
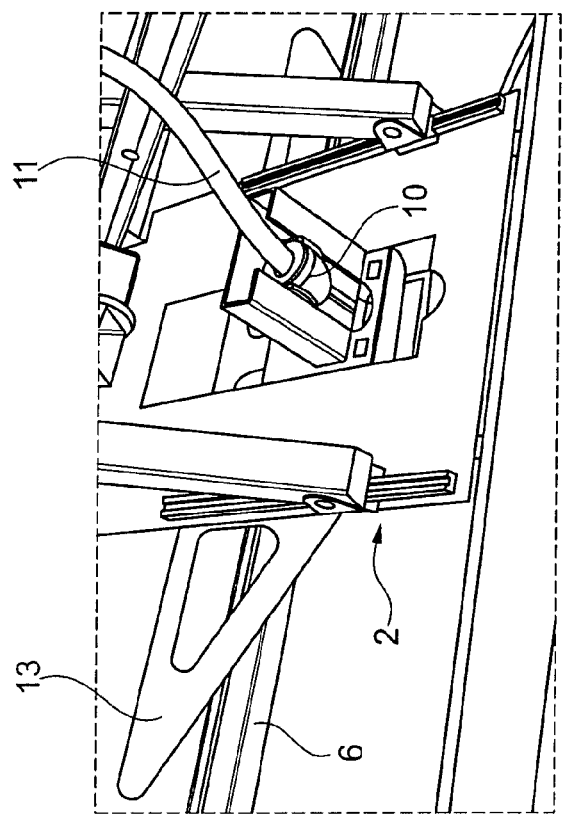
FIG. 10 shows a rearward of the position in which the first and second plug portions are ready for coupling in horizontal and vertical coincidence.

Accordingly the two plug portions are now also in a coincident position in the vertical direction and are ready for coupling, as can be seen from FIG. 10.

Figure 11:
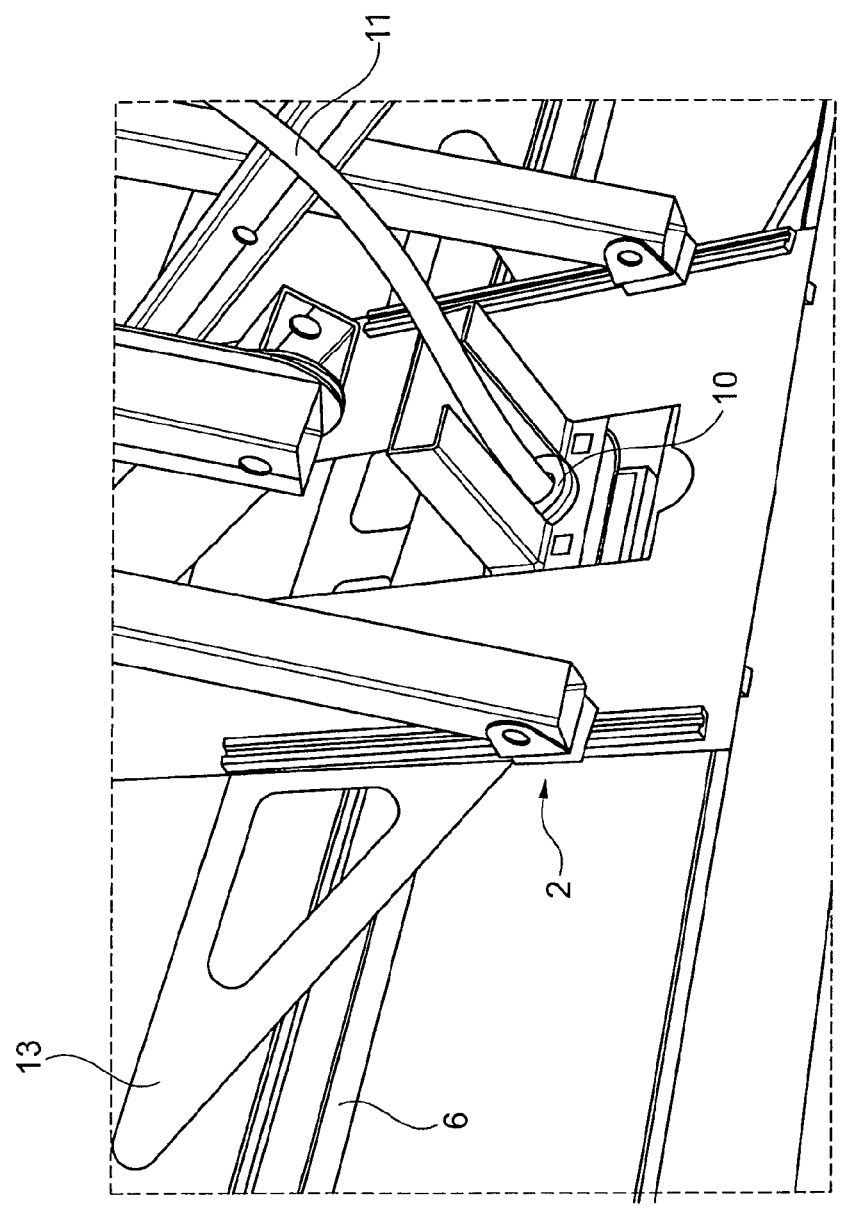
FIG. 11 shows a rearward view of the position in which both plug portions are connected.

FIG. 11 shows the situation in which the two plug portions 9 and 10 are connected together after the plug connection operation. Accordingly the connection (electrical/data/media) is between the freely displaceable device 1, here the RTG, by way of the coupling trolley 5 and the energy chain system 3, to a stationary fixed point.

Then, as shown in FIG. 12, the coupling unit 2 can be retracted. As shown in FIG. 12 the plug portions 9 and 10 still remain coupled. Accordingly the coupling trolley 5 is linked to the device 1 by way of the flexible and tensile-resistant connection 10. In that way the device 1 can be set in movement in the travel direction and can pull the coupling trolley along, with the connections being maintained.

For uncoupling purposes, as shown in FIG. 13, the plug portions 9 and 10 are separated again. The first plug portion 10 can then be retracted into the starting position in the coupling unit 2. In that way the device 1 and the coupling trolley 5 can again be displaced independently of each other.

LIST OF REFERENCES 1 freely displaceable device
2 coupling unit
3 energy chain system
4 energy chain
5 coupling trolley
6 profile member
7 guide channel
8 frame structure 9 second plug portion
10 first plug portion
11 connection
12 guide device
13 blade

What is claimed is:

1. A coupling unit comprising:

the coupling unit configured to couple a freely displaceable device into an energy chain system having an energy chain which is fixedly connected to a coupling carriage which is displaceable parallel to a path of displacement of the device, the coupling unit having a first plug portion which is connectable to the device in flexible and tensile-resistant relationship and which is connectable to a second plug portion arranged on the coupling carriage, the coupling unit extendable with the first plug portion in a direction of the coupling carriage so that the two plug portions are positionable horizontally and vertically relative to each other and are connectable together, and the coupling unit, after connection of the two plug portions, is retractable, while the device and the coupling carriage remain connected together in tensile-resistant and flexible relationship, wherein the coupling unit has a vertically displaceable wedge-shaped blade at which the first plug portion is arranged, wherein the blade is raisable with the first plug portion, when the coupling unit is extended and the coupling carriage, upon displacement parallel to the path of displacement of the device, engages the blade, and wherein the blade is configured such that, when the coupling carriage stops in a predetermined position relative to the device the blade falls to embrace the coupling carriage.

2. A system comprising:

a coupling unit configured to couple a freely displaceable device into an energy chain system having an energy chain which is fixedly connected to a coupling carriage which is displaceable parallel to a path of displacement of the device, the coupling unit having a first plug portion which is connectable to the device in flexible and tensile-resistant relationship and which is connectable to a second plug portion arranged on the coupling carriage, the coupling unit extendable with the first plug portion in a direction of the coupling carriage so that the two plug portions are positionable horizontally and vertically relative to each other and are connectable together, and the coupling unit, after connection of the two plug portions, is retractable, while the device and the coupling carriage remain connected together in tensile-resistant and flexible relationship, wherein the coupling unit has a vertically displaceable blade having the first plug portion, wherein the blade is raisable with the first plug portion, when the coupling unit is extended and the coupling carriage, upon displacement parallel to the path of displacement of the device, engages the blade, and wherein the blade is configured such that, when the coupling carriage stops in a predetermined position relative to the device, the blade falls to embrace the coupling carriage.

3. A system comprising:

a freely displaceable device having a coupling unit configured to couple the freely displaceable device into an energy chain system having an energy chain which is fixedly connected to a coupling carriage which is displaceable parallel to a path of displacement of the device, the coupling unit having a first plug portion which is connectable to the device in flexible and tensile-resistant relationship and which is connectable to a second plug portion arranged on the coupling carriage, the coupling unit extendable with the first plug portion in a direction of the coupling carriage so that the two plug portions are positionable horizontally and vertically relative to each other and are connectable together, and the coupling unit after connection of the two plug portions, is retractable, while the device and the coupling carriage remain connected together in tensile-resistant and flexible relationship, wherein the coupling unit has a vertically displaceable blade having the first plug portion, wherein the blade is raisable with the first plug portion, when the coupling unit is extended and the coupling carriage, upon displacement parallel to the path of displacement of the device, engages the blade, and wherein the blade configured such that, when the coupling carriage stops in a predetermined position relative to the device, the blade falls to embrace the coupling carriage.

4. A method to couple a freely movable device with an energy chain system having an energy chain, comprising:

connecting the freely movable device to a coupling unit, the coupling unit comprising a displaceable blade and a first plug portion, connecting the energy chain to a coupling carriage, the coupling carriage displaceable parallel to a path of displacement of the device and comprising a second plug portion, extending the blade and the first plug portion of the coupling unit in a direction towards the coupling carriage, displacing the coupling carriage parallel to the path of displacement of the device, engaging the blade of the coupling unit with the coupling carriage, raising the blade and the first plug portion of the coupling unit vertically with the coupling carriage, arranging the coupling carriage and the coupling unit relative to one another such that the blade and the first plug portion fall vertically after being raised, by which the blade embraces the coupling carriage and the first plug portion and the second plug portion are positioned horizontally and vertically relative to each other.

5. The method according to claim 4, further comprising:
connecting the first plug portion and the second plug portion to each other.

6. The method according to claim 5, further comprising:
retracting the blade and the first plug portion of the coupling unit in a direction away from the coupling carriage.

* * * * *